May 30, 1961 C. F. PHILLIPS 2,986,400
CHILD'S PROPELLED VEHICLE CONVERTIBLE TO A STROLLER
Filed Jan. 30, 1959 2 Sheets-Sheet 1
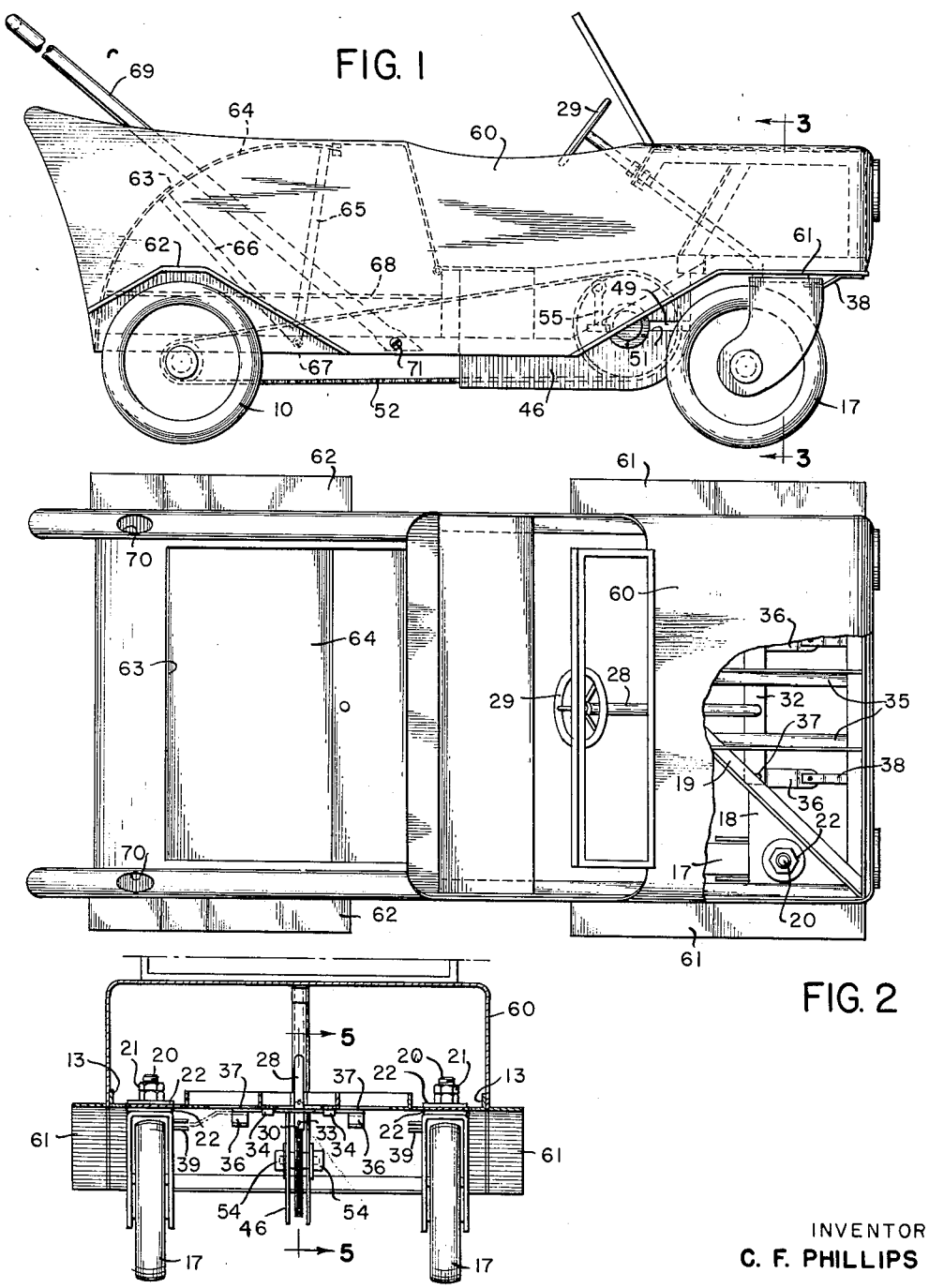
INVENTOR
C. F. PHILLIPS
BY A. Yates Dowell
ATTORNEY

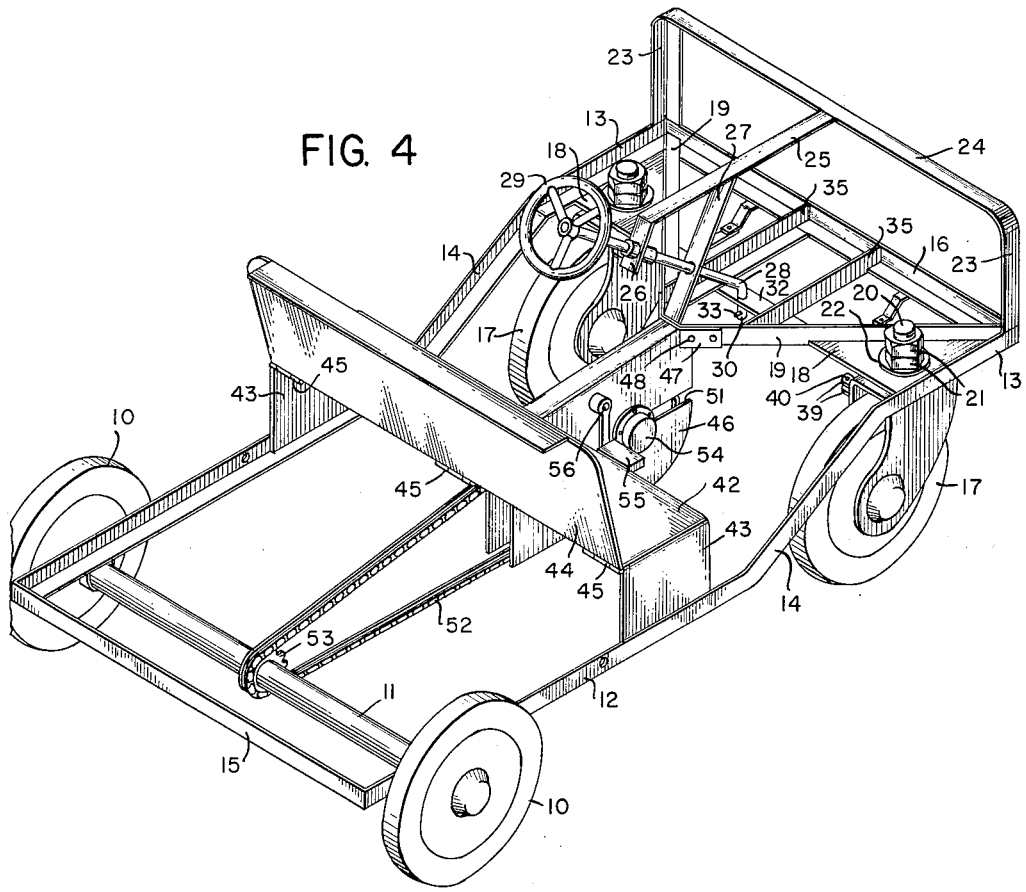
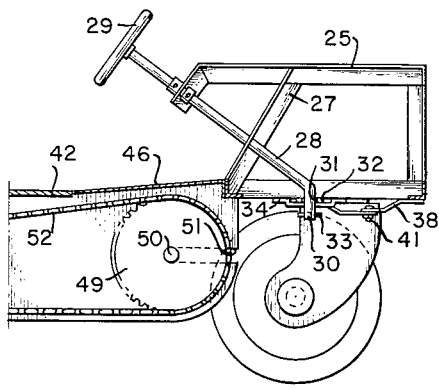

United States Patent Office 2,986,400
Patented May 30, 1961

2,986,400
CHILD'S PROPELLED VEHICLE CONVERTIBLE
TO A STROLLER
Charles F. Phillips, Rte. 1, Box 24, Philippi, W. Va.
Filed Jan. 30, 1959, Ser. No. 790,089
4 Claims. (Cl. 280—7.17)

This invention relates to children's vehicles and particularly to those of simple and inexpensive character available to families of limited means and used for amusement and entertainment as well as for the primary function of transporting children or objects.

The invention relates particularly to vehicles used for the holding and transporting of infants and small children, which vehicle is soon discarded due to the fact that they are of limited use because the children soon outgrow them.

It is an object of the invention to provide a combination vehicle which can be used as a means of transportation for an infant and later converted into a toy attractive to a young child.

Another object of the invention is to provide a baby carriage or stroller which can be readily used for the transportation of an infant and later converted into a vehicle which a youngster can propel or pedal and can control the direction of movement thereof.

Another object of the invention is to provide a baby stroller of the character indicated which can be used as an upright seat or can be modified to make a bed and in which a trunk has a movable panel to afford access to package space within the body of the device.

Another object is to provide a device of the character indicated of strong, durable, yet inexpensive construction including caster type wheels which are connected by a tie rod and have a connection to the steering column when the device is used as a self-propelled vehicle.

Other objects and advantages of the invention will be apparent from the following description taken in conjunction with the accompanying drawings wherein:

Fig. 1 is a side elevation illustrating one embodiment of the invention;

Fig. 2, a top plan view of Fig. 1 with portions broken away for clarity;

Fig. 3, a section on the line 3—3 of Fig. 1;

Fig. 4, a perspective illustrating the chassis of the vehicle with the outer covering removed; and Fig. 5, a section on the line 5—5 of Fig. 3.

Briefly stated, the present invention comprises a vehicle having a pair of rear wheels fixed on an axle and a pair of front caster wheels which support a chassis and an outside housing in the form of a midget automobile. The chassis comprises an angle frame the forward end of which is disposed at a higher elevation than the rear and suitable bracing to support an outer covering as well as a seat, drive mechanism and steering mechanism. A handle is provided which may be attached to the frame so that the vehicle may be used as a stroller to transport small children and parcels. Subsequently when the child has grown to the age when he no longer requires a stroller, the handle of the stroller may be removed, the steering mechanism may be connected to the front caster wheels and pedals which constitute a foot rest on the stroller may be attached to a chain drive unit and operated to propel the vehicle.

With continued reference to the drawings a vehicle is provided having a pair of rear ground engaging wheels 10 mounted on an axle 11 which supports the rear portion 12 of an angle frame. The forward portion 13 of the angle frame is disposed at an elevation higher than the rear portion 12 and connected to such rear portion by an intermediate inclined portion 14. The rear and the front of the vehicle are connected by angles 15 and 16 respectively and the front of the frame is supported by caster wheels 17 mounted on plates 18 which connect the forward portion 13 of the frame with a pair of inwardly inclined braces 19. Each of the caster wheels 17 have an exteriorly threaded shaft 20 projecting from the top thereof and such shaft extends through an opening in the plate 18 and is pivotally mounted on such plate by lock nuts 21. Bearing plates 22 are interposed between the lock nuts 21 and the upper surface of the plate 18 and between the upper surface of the caster housing and the lower surface of the plate 18 so that the caster wheels 17 may swivel with a minimum of friction.

A brace is provided at the front of the machine having angle legs 23 and a connecting member 24. Substantially midway of the connecting member 24, a longitudinal brace 25 is welded or otherwise attached and such brace extends rearwardly and is provided at its free end with a depending bracket 26. The longitudinal brace 25 is supported by an angle 27 from the intersection of the braces 19.

The depending bracket 26 and the angle 27 are provided with apertures to receive and guide a steering post or column 28 having a steering wheel 29 connected to its upper end and the lower end being provided with an offset portion 30. The offset portion 30 passes through an opening 31 in a tie bar 32 and is provided with a retaining pin 33 to prevent the accidental withdrawal of the offset portion 30 and to limit the amount of lateral movement of the tie bar 32. The tie bar 32 is supported on each side of the steering column by brackets 34 attached to braces 35 mounted between the front cross member 16 and the inwardly disposed brackets 19. A link 36 is pivotally connected to each of the outer ends of the tie bar 32 by pivot pins 37. The free end of the links 36 are connected to brackets 38 when the vehicle is adapted to be used as a stroller. During this time the steering wheel 29 may be turned a limited amount to allow the occupant of the vehicle to pretend that he is guiding the vehicle.

A pair of lugs 39 having openings 40 project inwardly from the upper rear surface of the inner caster housings and when the vehicle is converted for use as a pedal car the links 36 are disengaged from the brackets 38 and pivoted around the pins 37 and inserted between the lugs 39. Fastening means 41 which were used to attach the links 36 to the brackets 38 are inserted through the openings 40 and the outer end of the links to secure the links to the casters at which time movement of the steering wheel 29 will cause lateral movement of the tie bar 32 and the caster wheels 17 so that the occupant can control the direction of the movement of the vehicle.

A seat 42 having depending legs 43 is welded or otherwise attached to the lower portion 12 of the frame and such seat is adapted to support the weight of the occupant. A back 44 is mounted on the rear edge of the seat 42 by means of hinges 45 in such a manner that the seat back may be lowered to substantially the same plane as the seat to form a bed for a small child.

In order to prevent the child from slipping out of the seat and falling beneath the automobile, a cross bar is provided in the form of a chain guard 46 connected at one end to the seat 42 and the opposite end is provided with outwardly turned flanges 47 which are connected to braces 19 by screws or other fasteneres 48. The chain guard 46 is adapted to support a sprocket 49 on a shaft 50 and such shaft may be inserted in the chain guard through a slot 51 in the forward end of each side of the chain guard 46. The sprocket 49 is adapted to drive a chain 52 and a sprocket 53 fixed to the rear axle 11 and cause rotation of the rear wheels 10.

When the vehicle is to be utilized as a stroller, a casing 54 covers the outer ends of the shaft 50 of the sprocket and the pedals 55 are suspended from lugs 56 in such a manner that the pedals may be used as a foot rest for the occupant. When the vehicle is converted to a pedal propelled vehicle the pedals 55 are removed from the lugs 56 and attached to the outer ends of the shaft 50 to cause rotation of the sprocket 49 to drive the vehicle.

A housing or outer covering 60 is adapted to be applied over the chassis and attached thereto as illustrated in Figs. 1, 2 and 3 and such housing may have fenders 61 and 62 at the front and rear respectively. The housing 60 is provided with an opening 63 behind the seat and such opening is adapted to be closed by a cover 64 supported by braces 65 and 66 from a pivot 67 on the lower frame portion 12. The cover 64 may be removably attached to the back of the seat by a conventional spring loaded catch or in any other desired manner to hold the cover in the raised position. When the cover is released it will be pivoted downwardly to expose a floor 68 carried within the housing 60 which may be used to store parcels or the like.

In order to propel the vehicle when it is disposed as a stroller, a handle 69 of generally U-shaped construction may be inserted through openings 70 in the upper portion of the housing 60 and the lower ends of such handle are attached by fastening means 71 to the lower frame portion 12 so that an older person may push the vehicle.

In the operation of the device when used as a stroller the steering mechanism is disassembled from the caster wheels and the pedals are removed from the sprocket 49 and mounted on the lugs 56 to form a footrest and the handle 69 is attached to the frame 12. Caster wheels 17 are freely rotatable so that the person pushing the vehicle may guide it in any direction desired and the occupant of the vehicle may operate the steering wheel to pretend that he is steering.

When the vehicle is used as a pedal car the handle 69 is removed from the vehicle, the steering mechanism is connected to lugs 39 on the caster wheels 17 and the pedals are connected to the shaft 50 so that movement of the pedals will propel the vehicle either forward or backward and the steering mechanism will control the direction of travel of the vehicle.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A child's propelled vehicle convertible to a stroller comprising a pair of rear wheels fixed to a rotatable axle, a pair of front caster wheels, a chassis supported by said rear wheels and said front wheels, one end of said chassis being disposed at a higher elevation than the other end of said chassis, an outside housing mounted on said chassis, said housing having an opening and a pivotally mounted cover for said opening, steering mechanism mounted on said chassis, a pair of connecting links pivotally mounted at one end of said steering mechanism and the other end to said chassis, means for disconnecting said other end of said links from said chassis and connecting said other end to said caster wheels, a chain drive mounted on said chassis and connected to said rotatable axle, a chain guard for said chain drive, a pair of pedals mounted on said pedal shaft and adapted to be mounted on said chain guard, means for mounting said pedals on said chain drive, a handle for said vehicle, and detachable means for fastening said handle to said chassis so that the vehicle may be pushed.

2. A child's propelled vehicle convertible to a stroller comprising a pair of wheels fixed to a rotatable axle, a pair of caster wheels, a chassis supported at one end by said wheels and at the opposite end by said caster wheels, said opposite end being disposed at a higher elevation than said one end, a steering post mounted on said chassis, a steering wheel mounted on one end of said steering post, a tie bar in cooperative relation with the opposite end of said steering post, a connecting link pivotally mounted on each end of said tie bar, means for selectively attaching said connecting links to said chassis or to said caster wheels, a chain drive mounted on said chassis and connected to said rotatable axle, a pair of pedals, means for selectively mounting said pedals on said chain drive or on said chassis, and a handle detachably mounted on said vehicle whereby said vehicle may be pushed.

3. A child's propelled vehicle convertible to a stroller comprising a pair of wheels fixed to a rotatable axle, a pair of caster wheels, a chassis supported by said wheels, a steering post mounted on said chassis, a steering wheel mounted on one end of said steering post, a tie bar in cooperative relation with the opposite end of said steering post, a connecting link pivotally mounted on each end of said tie bar, means for selectively attaching said connecting links to said chassis or to said caster wheels, a chain drive mounted on said chassis and connected to said rotatable axle, a pair of pedals, means for selectively mounting said pedals on said chain drive or on said chassis, and a handle detachably mounted on said vehicle whereby said vehicle may be pushed.

4. A child's self-propelled vehicle having front and rear wheel means with the rear wheels fixed to a rotatable axle, said front wheel means being of the caster type, a chassis supported by said wheel means, a housing mounted on said chassis, steering mechanism mounted on said chassis, connecting linkage between said steering mechaism and said chassis, means whereby said links may be disconnected from said chassis and connected to said caster wheels, a chain drive for said rear wheel means mounted on said chassis and connected to said rotatable axle, pedals mounted on said vehicle, means whereby said pedals may be attached to said chain drive, a handle and detachable means for fastening said handle to the vehicle so that the latter may be pushed by pushing said handle.

References Cited in the file of this patent

UNITED STATES PATENTS

| | | |
|---|---|---|
| 1,575,618 | Burlingame | Mar. 9, 1926 |
| 1,662,292 | Bender | Mar. 13, 1928 |
| 2,402,046 | Holder | June 11, 1946 |
| 2,529,749 | Wade et al. | Nov. 14, 1950 |
| 2,645,505 | Durand | July 14, 1953 |
| 2,797,105 | Douglas et al. | June 25, 1957 |